United States Patent
Crafts et al.

(10) Patent No.: US 6,583,388 B2
(45) Date of Patent: Jun. 24, 2003

(54) HIGH THERMAL EFFICIENCY, SMALL FORM-FACTOR PACKAGES INCLUDING THERMALLY INSULATIVE CAVITIES, AND TRANSFER MOLDED VARIANTS

(75) Inventors: Douglas E. Crafts, San Jose, CA (US); David J. Chapman, San Jose, CA (US); Steven M. Swain, San Jose, CA (US)

(73) Assignee: JDS Uniphase Corporation, San Jose, CA (US)

( * ) Notice: Subject to any disclaimer, the term of this patent is extended or adjusted under 35 U.S.C. 154(b) by 39 days.

(21) Appl. No.: 10/010,931

(22) Filed: Nov. 13, 2001

(65) Prior Publication Data

US 2003/0089694 A1 May 15, 2003

(51) Int. Cl.$^7$ .................................................. H05B 1/00
(52) U.S. Cl. .......................... 219/209; 385/49; 219/530
(58) Field of Search ................................. 219/209, 497, 219/530, 513; 385/140, 37, 49; 257/433

(56) References Cited

U.S. PATENT DOCUMENTS

| | | | | |
|---|---|---|---|---|
| 5,919,383 A | * | 7/1999 | Beguin et al. ............... 219/209 |
| 5,994,679 A | * | 11/1999 | De Veau et al. ............. 219/530 |
| 6,114,673 A | * | 9/2000 | Brewer et al. ............... 219/530 |
| 6,144,013 A | | 11/2000 | Chu et al. .................... 219/209 |
| 6,184,504 B1 | * | 2/2001 | Cardella ....................... 219/513 |
| 6,327,408 B1 | * | 12/2001 | Hiller ............................ 385/49 |
| 6,384,385 B1 | * | 5/2002 | Puleo ........................... 219/497 |
| 6,486,440 B1 | * | 11/2002 | Crafts et al. ................. 219/209 |
| 2002/0114570 A1 | * | 8/2002 | Matsumoto et al. .......... 385/37 |
| 2002/0175387 A1 | * | 11/2002 | Nakanishi et al. .......... 257/433 |
| 2003/0016938 A1 | * | 1/2003 | Hatayama et al. .......... 385/140 |

* cited by examiner

Primary Examiner—Teresa Walberg
Assistant Examiner—Leonid Fastovsky
(74) Attorney, Agent, or Firm—Allen, Dyer, Doppelt, Milbrath & Gilchrist, P.A.

(57) ABSTRACT

An optical component package, having an insulative buffer placed against the component, enclosing a first insulative cavity against a temperature-sensitive portion of the component. An outer package provides additional insulation for the component. The buffer may be formed of a soft insulative material, and pressed against the component by an inner surface of the outer package. For the PLC embodiments disclosed, the buffer is planar and includes a frame projecting from its perimeter toward the component to form the cavity. A heater may be positioned proximate the optical component to control its temperature, in which case a second buffer may be placed against the heater, enclosing a second insulative cavity against the heater, aligned with the temperature-sensitive portion of the component. The buffers and insulative cavities of the present invention provide important insulation for optical areas requiring precise temperature control for proper operation.

34 Claims, 4 Drawing Sheets

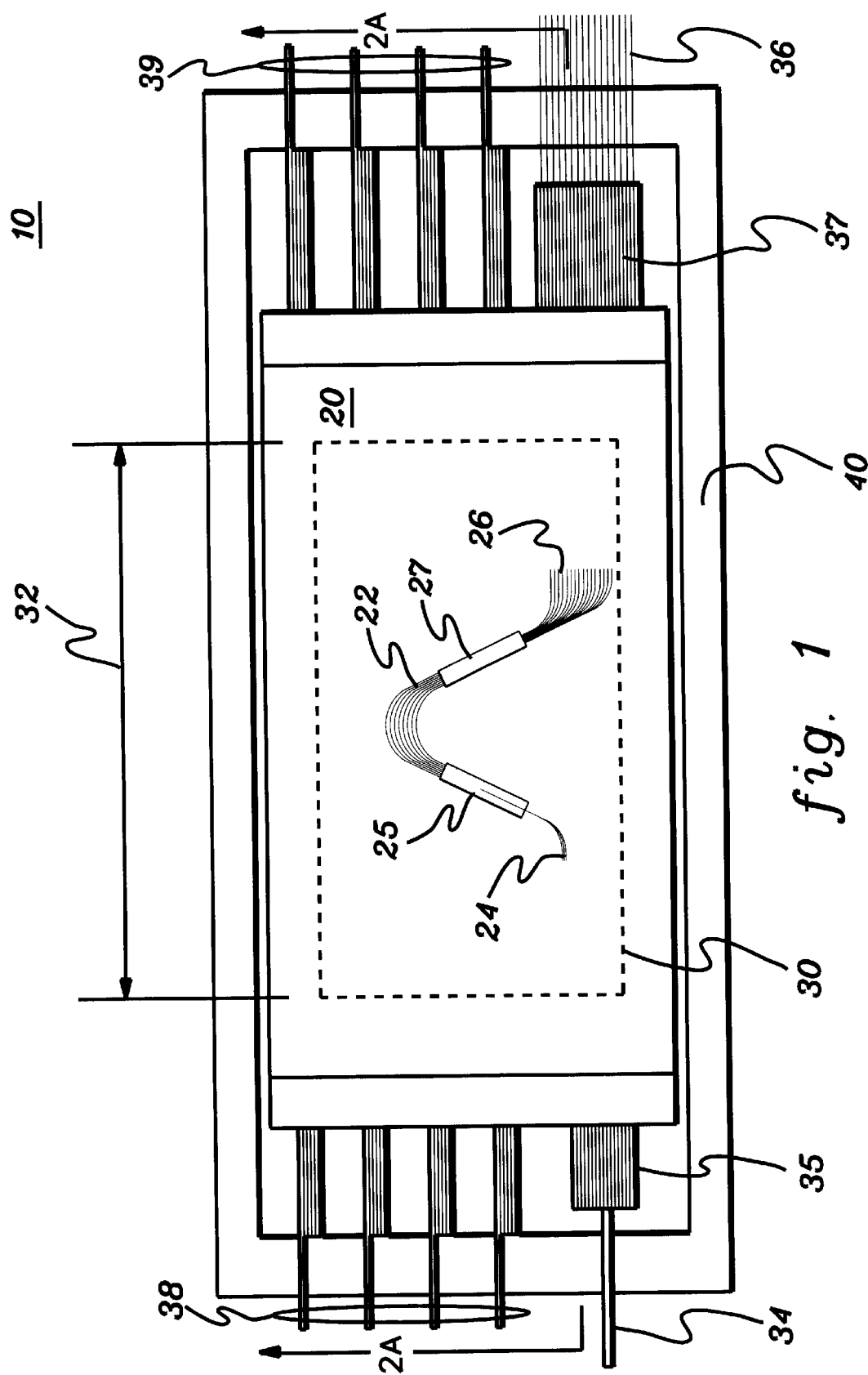

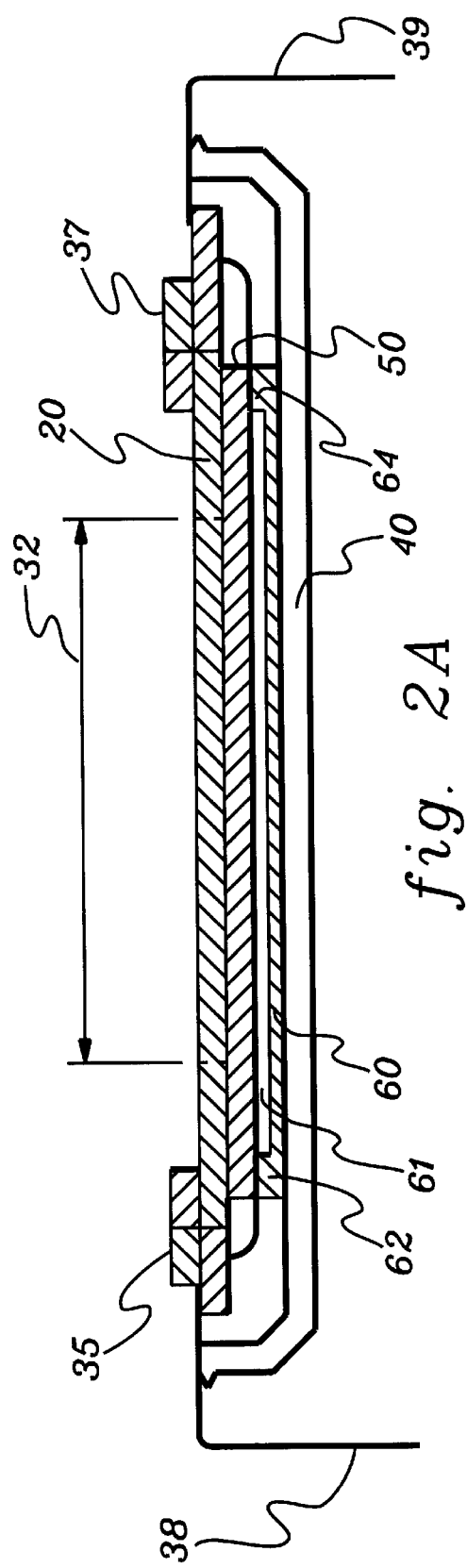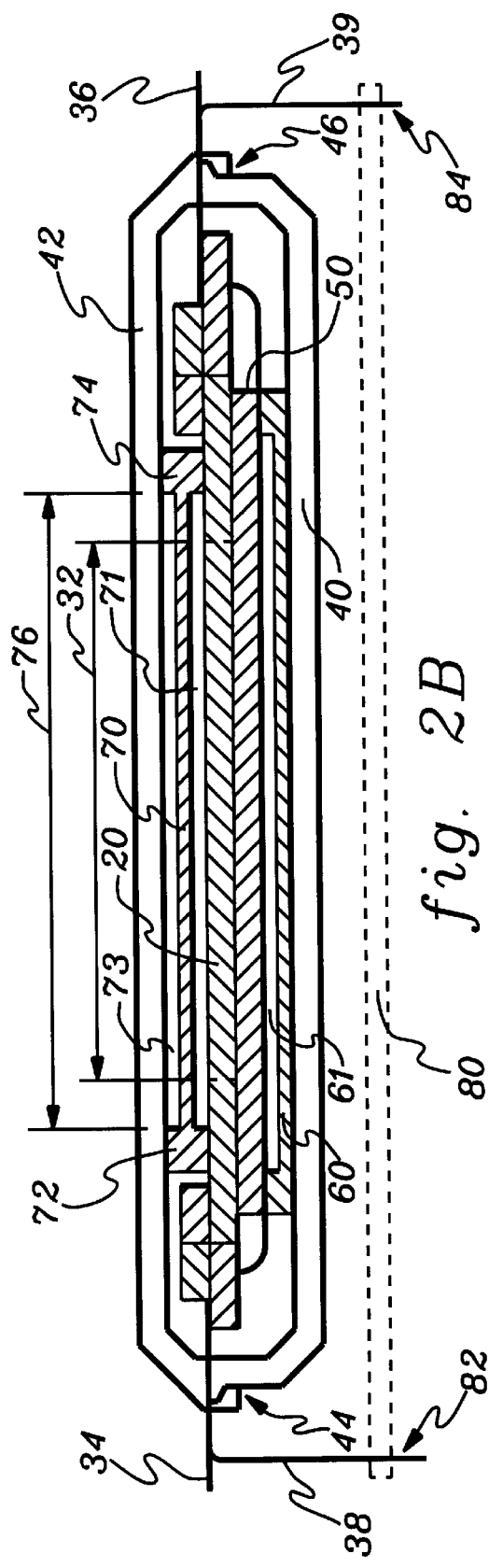

HIGH THERMAL EFFICIENCY, SMALL FORM-FACTOR PACKAGES INCLUDING THERMALLY INSULATIVE CAVITIES, AND TRANSFER MOLDED VARIANTS

CROSS-REFERENCE TO RELATED APPLICATIONS

This Application relates to the previously filed, commonly assigned U.S. patent application Ser. No. 09/901,474 entitled "Redundant Package for Optical Components" filed Jul. 9, 2001, which Application is hereby incorporated herein by reference in its entirety.

FIELD OF THE INVENTION

The present invention relates to component packaging. More particularly, the present invention relates to a thermally insulative, hermetic or non-hermetic package for isolating optical components (e.g., arrayed waveguide gratings) from external stresses.

BACKGROUND OF THE INVENTION

Fiber optic communication links have been conventionally employed in long-haul, point-to-point networks with controlled environments at all interface points. Such highly controlled, "central office" surroundings usually offer relatively benign operating environments (temperature, humidity, mechanical) for components. Consequently, highly functional components could be developed and installed without considering the impact of other, more extreme environments.

Recent technological advances, coupled with increasing bandwidth demand, are rapidly expanding the use of fiber optic components beyond the "central office" and into potentially harsher environments. For example, dense wavelength division multiplexing (DWDM) enables the transmission of multiple, independent wavelength streams across a single fiber. Predictably, this capability has resulted in the requirement to add or drop these optical channels along the previously untapped long lengths of fiber (and outside of the central office environment) to provide access to the individual wavelength streams. Optical add/drop multiplexers (OADMs) are employed for this function, enabled by arrayed waveguide grating (AWG) components for filtering and forwarding individual wavelengths.

In addition to these technological advances, simple market forces are pushing fiber networks beyond central offices and into the diverse terrain of "metro" markets. This ever-increasing need for bandwidth which only fiber can deliver is resulting in the widespread deployment of fiber networks, and their associated components, into the harsher, less environmentally controlled conditions present in the metro market.

The demands placed on component designers now reach far beyond optical performance, and into the realms of thermal and mechanical insulation. Certain qualification standards (e.g., Telcordia) exist for reliability of optical components, and many customers require qualification under these standards. AWGs however are thin, fragile chips with narrow waveguides produced using planar lightwave circuit (PLC) processing techniques. The various processing tolerances required to meet the requisite optical specifications are already very tight, and in fact get tighter as the need to process more and closer channels increases.

There is also a need to maintain the tightly controlled, internal operating environment (e.g., temperature) for proper optical component operation in a package. The optical performance of PLC waveguides is especially sensitive to temperature. These components usually include active heating elements in closed loop feedback configurations to ensure temperature stability. It is therefore important to thermally insulate the package to ensure the PLC is kept at stable temperature by the heating element.

Environmentally secure packages therefore now play a vital role in the widespread commercialization of these devices. Without adequate packaging, components such as AWGs, with their highly unique and useful functions, would be relegated to laboratory environments only. It is difficult and costly to impose yet additional requirements on the chip process in the form of advanced materials, processing techniques, etc. to satisfy the harsher environmental standards discussed above.

What is required, therefore, are advanced packaging techniques to enable the widespread use of otherwise fragile optical components in diverse and often stressful environments, and which also maintain the internal operating temperature of these optical components to ensure their proper optical performance.

SUMMARY OF THE INVENTION

These requirements are met, and further advantages are provided, by the present invention which in one aspect is an optical component packaging technique, including the package itself, and its method of fabrication. According to the present invention, an insulative buffer is placed against the optical component, enclosing a first insulative cavity against a temperature-sensitive portion of the component. An outer package encloses the buffer and optical component, forming additional insulation for the component.

In one embodiment, the first buffer may be formed of a soft insulative material, and pressed against the component by an inner surface of the outer package. The buffer may be pre-adhered to the inner surface of the outer package, such that upon assembly thereof, the buffer is pressed into place against the component. For the PLC embodiments disclosed, the buffer is generally planar and may include a frame projecting from its perimeter toward the component to form the cavity against the component.

A heater may be positioned proximate the optical component to control the temperature of its temperature-sensitive area, in which case a second buffer may be placed against the heater, enclosing a second insulative cavity against the heater, aligned with the temperature-sensitive portion of the component. If the optical component is generally planar, the heater is also generally planar, and adhered to the optical component along a planar surface thereof, to maintain the temperature of the temperature-sensitive portion of the optical component. The cavities enclosed by the first and second buffers are both respectively aligned to the temperature-sensitive portion of the optical component.

A portion of the outer package may be transfer-molded, and the buffer advantageously separates transfer-molded material from the temperature-sensitive area of the component.

The buffer may also form a second, opposing insulative cavity against an inner surface of the outer package, in which case the buffer includes a frame projecting from its perimeter toward both the component and the inner surface of the outer package, to thereby form the first cavity against the component and the second cavity against the inner surface of the outer package.

The optical component may comprise a planar lightwave circuit (PLC), wherein the temperature-sensitive portion of the component includes at least one optical waveguide formed in the PLC, e.g., an arrayed waveguide grating.

This package is especially useful if the optical component comprises a planar lightwave circuit (PLC), e.g., an arrayed waveguide grating (AWG), which requires tight temperature control and structural integrity to maintain the integrity of the optical paths.

The insulative cavities of the present invention thermally insulate the temperature-sensitive portions of the PLC from the outside ambient environment. The thermal isolation also reduces the power consumption required to maintain tight temperature control of the device and reduces thermally induced mechanical stresses which could negatively affect the device performance or reliability.

BRIEF DESCRIPTION OF THE DRAWINGS

The subject matter which is regarded as the invention is particularly pointed out and distinctly claimed in the concluding portion of the specification. The invention, however, both as to organization and method of practice, together with further objects and advantages thereof, may be best understood by reference to the following detailed description of the preferred embodiment(s) and the accompanying drawings in which:

FIG. 1 is a top plan view of an open PLC package in accordance with the present invention;

FIG. 2a is a side, cross-sectional view of the open PLC package of FIG. 1;

FIG. 2b is a side, cross-sectional view of a PLC package closed with a lid, mounted on a user board, in accordance with the present invention;

BEST MODE FOR CARRYING OUT THE INVENTION

Figure 3:
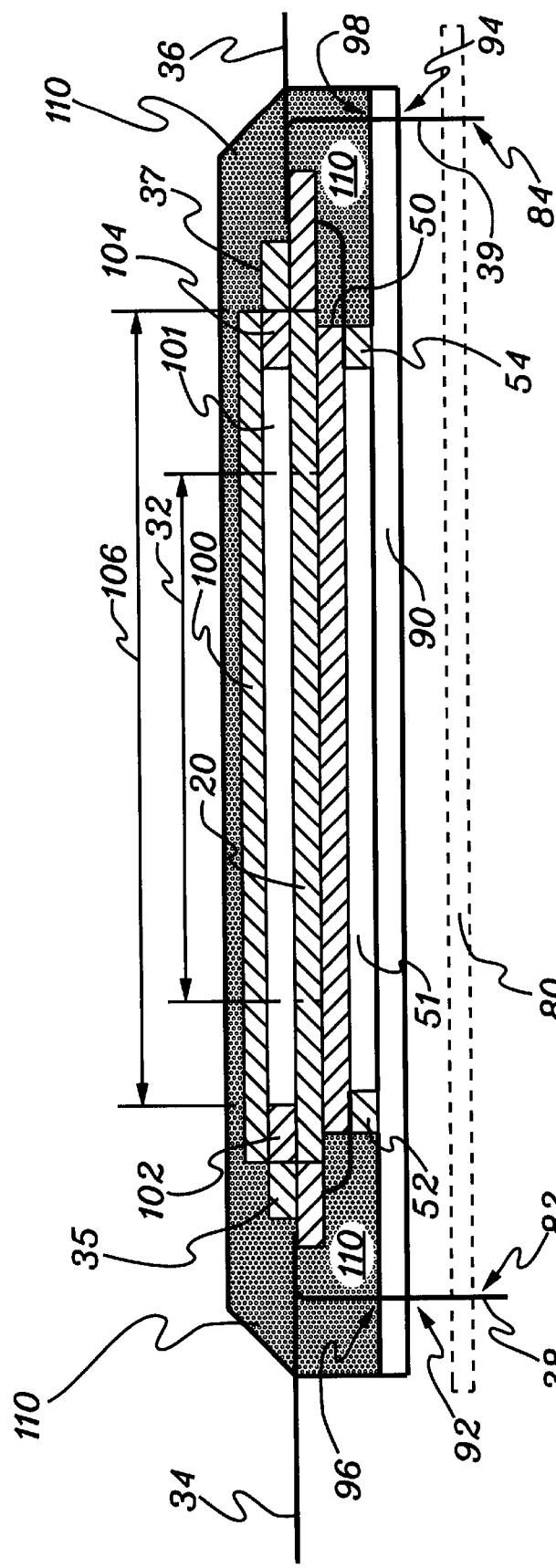
FIG. 3 is a side, cross-sectional view of a complete, transfer-molded PLC package, in accordance with the present invention.

With reference to FIG. 1, an exemplary planar lightwave circuit (PLC) package 10 is shown having an arrayed waveguide grating (AWG) on a PLC substrate 20 (e.g., silicon). As known to those in the art, an AWG employs an array of waveguides 22 having carefully controlled, differing path lengths which cause constructive phase interference patterns on the optical signals transmitted therein. This technique is useful for multiplexing or demultiplexing optical signals passed from the array input/focusing region 24/25 to the array output/focusing region 26/27.

In the exemplary demultiplexing application shown, input fiber optic 34 is interfaced to substrate 20 using a glass or silicon v-groove block assembly 35. Multiple output fibers 36 are also interfaced to the substrate 20 using a similar block assembly 37. The substrate is mounted over a heating element (not visible), which is connected to control lead groups 38 and 39. These control leads enable active, external monitoring of the temperature at various points in the package (using, e.g., thermistors mounted in the package and connected to the leads), and also enable active control of the heating element to keep substrate 20 at a fixed temperature (e.g., to within 0.1 degree Celsius), according to, e.g., an external feedback circuit. As discussed below, the PLC elements are all mounted in the base 40 of package 10, over which a lid (not shown) will be placed.

The tight spatial and thermal tolerances necessary for proper operation of the AWG, as discussed above, lead to the requirements for effective packaging and sealing for use in adverse environmental conditions. Moreover, because of the tight thermal tolerances necessary for proper waveguide operation, as maintained by the heating element, the package must also provide a high degree of thermal insulation around certain areas. For example, area 30 on substrate 20 (noted by a dashed line) is one area requiring a high degree of thermal insulation, since that area includes waveguide area 22 and focusing regions 25 and 27. In accordance with the present invention, this temperature-sensitive area 30 (and/or a corresponding area on the lower surface of the heating element) is subject to an additional level of thermal insulation.

For clarity with respect to the side views discussed below, lateral dimension 32 is also used to designate this area in the cross-sectional views below, but those skilled in the art will recognize that the principles of the present invention extend to the entire two dimensional area 30.

With reference now to the side, cross-sectional view of FIG. 2a, a planar heating element or heater 50 is now visible under substrate 20. The heater is formed from, e.g., aluminum nitride. The heater is used to ensure that substrate 20 is maintained at a constant temperature (very uniformly across its surface), since temperature changes will cause minor structural changes in AWG signal paths, and negatively impact its optical performance. Substrate 20 is mounted onto heater 50 using, for example, a low modulus silicon material. Aluminum nitride is chosen for heater 50 since its coefficient of thermal expansion (CTE) is approximately matched to that of the silicon substrate, thus preventing any adverse thermo-mechanical stress at this interface. Other materials with similar thermal conductivities combined with Si-matched CTEs would serve similar function. These materials may include Si Carbide or Si. Such materials in general are highly thermally conductive, providing high uniformity of temperature across the heater, and therefore across the temperature sensitive area 32 of the substrate 20.

In accordance with the present invention, buffer 60 is provided between the package base 40 and heater 50. This buffer can be formed from, e.g., an insulative elastomer, such as closed cell silicon or a foam elastomer. The generally planar buffer includes extension sections 62 and 64, actually part of a continuous, extension frame structure 63 about the perimeter of buffer 60 (see FIG. 4). An insulative cavity 61 is formed along the lower surface of heater 50, upon placement of the buffer between the package base 40 and heater 60.

The terms "cavity" and "insulative cavity" are used broadly herein to connote any type of insulative area enabled by the structure of the buffer. The most convenient material filling cavity 61 is air, but any gaseous insulator can be used, as could a high-air content insulator, or even a vacuum if possible. The term "buffer" is used broadly herein to connote any type of structure that creates the cavities without inducing any adverse contact or stresses on the underlying substrate. Rigid or semi-rigid structures are disclosed herein, but the buffer could also be a diaphragm or similar structure placed during an injection-molding process discussed further below. The buffers may also provide some moisture sealing properties.

The extra level of cavity insulation 61 is advantageously located about the center of heater 50, in vertical correspondence to the temperature sensitive area 32 of the substrate 20, thereby providing extra insulation in this area. By forming this buffer from a soft foam, it can be held in place using pressure between the package base 40 and heater 50, and effect a proper seal against the heater. Though the buffers disclosed herein are not relied upon for significant structural strength, they will provide some level of dampening and therefore can assist in holding the substrate/heater combination in place, while also providing additional insulation against mechanical shocks, i.e., dropping.

In one embodiment, the buffer can be pre-adhered to the inner surface of the base and appropriately sized, so that upon placement of the heater in the package, the buffer is pressed against the heater, the appropriate seal made, and the insulative cavity 61 formed. As discussed further below, the extensions 62 and 64 can also extend below the planar section of buffer 60 and thereby form yet another cavity against package base 40.

A fully formed, closed package is depicted in the similar (but not identical) side, cross-sectional view of FIG. 2*b*. Here, package lid 42 is now shown snapped onto the package base 40 in areas 44 and 46. In accordance with the present invention, buffer 70 is disposed between silicon substrate 20 and lid 42. Generally planar buffer 70 is formed from a soft, insulative material (similar to that of buffer 60 discussed above), and also includes a perimeter extension frame, sections 72 and 74 of which are depicted in this side view. In this embodiment, the extension frame extends both above and below the central section of buffer 70, creating two insulative cavities 71 and 73. Notably, these cavities are both of a breadth 76 sufficient to encompass the temperature sensitive area 32 of substrate 20. Buffer 70 can also be pre-adhered to the inner surface of lid 42, and appropriately sized to press against the surface of substrate 20 upon lid closure, thereby permanently forming insulative cavities 71 and 73 in the package.

Input 34 and output 36 fibers are also shown in this view, along with a possible user mounting board 80. This board may have through-holes in areas 82 and 84, through which control leads 38 and 39 can be placed, and permanently soldered. In this manner, the entire package is rigidly suspended over board 80 using rigid leads 38 and 39; while allowing the fragile fibers 34 and 36 to be handled independently.

As discussed above, the package base 40 and package lid 42 can be snapped together. The base and lid are formed from an insulative material such as ULTEM or PPS (polyphenyl sulfide). The additional air cavities formed around the inner components by this package shell also provide additional insulation. Epoxy can be used to seal the base and lid together at the snapping points. The input and output fiber ribbons, and the control leads, can be carried out of the package through openings, also sealed with epoxy.

Single or multiple cavity embodiments are possible both below the heater and above the substrate. Here, as an example only, a single cavity is shown below the heater, and a dual cavity above the substrate With reference to FIG. 3, a "transfer molded" embodiment of the present invention is depicted in a side, cross-sectional view similar to the views used above. Like numerals are used to denote like elements, such as substrate 20, heater 50, fibers 34, 36, v-groove assemblies 35, 37 and control leads 38, 39. However, in this embodiment, a generally planar package base 90 (e.g., FR5 or glass) is used, and an encompassing, transfer-molded layer of epoxy 110 replaces the package lid. The epoxy completely covers all exposed surfaces, above the base 90, except the temperature-sensitive areas of the heater and substrate, which are subject to areas of cavity insulation in accordance with the present invention. In one embodiment, the epoxy can be formed completely around and under the base also (not shown).

Injection molding techniques are known to those skilled in the art, and involve the preparation of a cavity mold which determines the final, outer profile of the epoxy, and then pressing heated epoxy around the internal package components using the mold. The epoxy used is, for example, silica-filled or glass-filled. Injection molding the package avoids some of the manual assembly necessary for the shell packages discussed above, and provides higher degrees of thermal, mechanical and moisture insulation.

In accordance with the present invention, to provide additional thermal insulation (and protect the heater/substrate from the injected epoxy), insulative cavities 51 and 101 are formed in this embodiment, similar to cavities 61 and 71 discussed above, with the optional characteristic that they may be rigid components, rigidly attached to the PLC, and capable of withstanding the high molding pressures and stresses due to material shrinkage upon solidifying during the molding process.

For example, frame sections 52 and 54 are shown separating heater 50 from base 90 (e.g., FR5 or glass), forming insulative cavity 51. This frame could be a separate structure epoxied into place, an integral part of the base and/or heater, or alternatively an epoxy bond line deposited about the perimeter of the base and/or heater 90. Upon assembly of the base and heater, insulative cavity 51 is formed.

Similarly, frame sections 102 and 104 can also be employed to form cavity 101. In the embodiments above, these sections serve as strengthening "pyrex caps" placed near the edges of the substrates to facilitate polishing of the substrate edges (and waveguides) to provide a large, smooth surface to adhere the V-groove fiber assemblies 35, 37. This frame could also be formed from, e.g., an epoxy bond line deposited about the perimeter of the substrate. Here an additional cap or lid 100 (e.g., glass) is adhered to the frame, forming insulative cavity 101. This cavity has a breadth 106 sufficient to encompass the temperature-sensitive area 32 of substrate 20.

Though the buffers here are formed from the frame sections 52/54 with base 90; or frame sections 102/104 with lid 100; other buffer structures can be employed without departing from the invention. For example, the buffer structures discussed above with respect to FIGS. 2*a–b* can be used, as could a diaphragm-like material sufficient to create the cavity during the molding process.

Advantageously, insulative cavities 51 and 101 (possibly 6 micrometers in height or smaller) also protect the sensitive areas of the substrate and heater from the transfer molded epoxy, including molding pressures and shrinkage stresses that occur as a result of the solidification of the molding material during the molding process.

In this embodiment, control leads 38 and 39 are shown passing through "holes" of the package base 90 in areas 92 and 94 respectively. As discussed above, the entire package can then be mounted on a user board 80 at solder points 82 and 84. In an alternate embodiment (not shown), the leads could be formed to provide surface mounting to areas 96 and 98, and surface mount pads could be used at areas 92 and 94 for further device connection.

Figure 4:
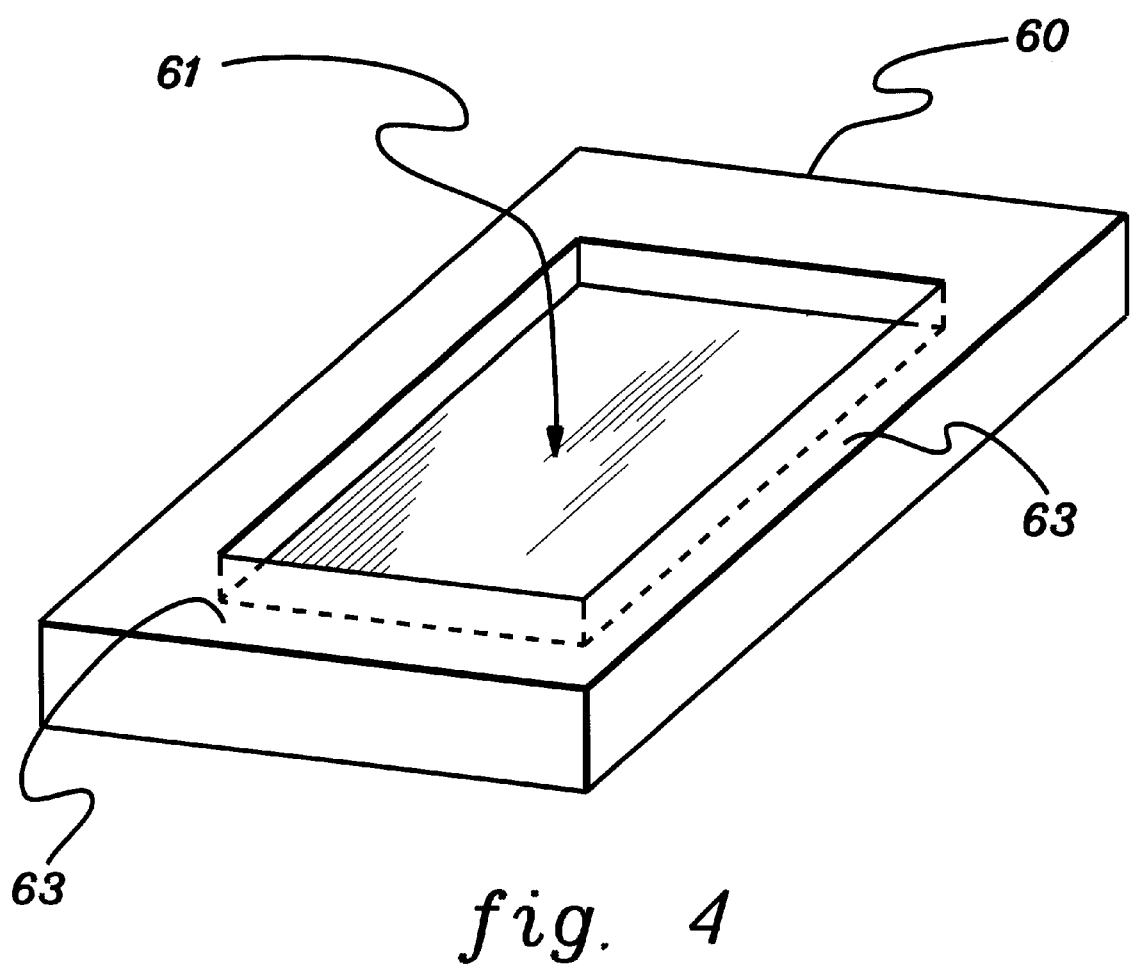
FIG. 4 is a perspective view a sample buffer with a perimeter frame in accordance with the present invention.

To expand upon the principles depicted in the cross-sectional views above, FIG. 4 depicts in perspective view a sample buffer 60 having a perimeter frame 63, which forms an entirely enclosed cavity 61 upon its placement over a substrate.

The isolated airspaces created by the insulative cavities of the present invention thermally insulate the temperature-sensitive portions of the PLC from the outside ambient environment. The thermal isolation also reduces the power consumption required to maintain tight temperature control of the device and reduces thermally induced mechanical stresses which could negatively affect the device performance or reliability. These parameters are important to the commercial viability of the device. The outer packages (shell or transfer molded) are formed from a material having low thermal conductivity, to promote this insulating function.

While the invention has been particularly shown and described with reference to preferred embodiment(s) thereof, it will be understood by those skilled in the art that various changes in form and details may be made therein without departing from the spirit and scope of the invention.

What is claimed is:

1. A thermally insulative optical component package, comprising:
    a first insulative buffer disposed against the optical component, enclosing a first insulative cavity against a temperature-sensitive portion of the component; and
    an outer package enclosing the buffer and optical component, forming additional insulation for the component.

2. The component package of claim 1, wherein the first buffer is formed of a soft insulative material, and pressed against the component by an inner surface of the outer package.

3. The component package of claim 2, wherein the first buffer is pre-adhered to the inner surface of the outer package, such that upon assembly thereof, the buffer is pressed into place against the component.

4. The component package of claim 1, wherein the first buffer is generally planar and includes a frame projecting from its perimeter toward the component to form the cavity against the component.

5. The component package of claim 1, wherein at least a portion of the outer package is transfer-molded, and wherein the first buffer separates transfer-molded material from the temperature-sensitive area of the component.

6. The component package of claim 1, wherein the first buffer forms a second, opposing insulative cavity against an inner surface of the outer package.

7. The component package of claim 6, wherein the first buffer is generally planar and includes a frame projecting from its perimeter toward both the component and the inner surface of the outer package, to thereby form the first cavity against the component and the second cavity against the inner surface of the outer package.

8. The component package of claim 1, wherein the optical component comprises a planar lightwave circuit (PLC), and wherein the temperature-sensitive portion of the component comprises at least one optical waveguide formed in the PLC.

9. The component package of claim 8, wherein the PLC comprises an arrayed waveguide grating, within the temperature-sensitive portion of the component.

10. The component package of claim 1, further comprising:
    a heater proximate the optical component to control the temperature of the temperature-sensitive area thereof; and
    a second insulative buffer disposed against the heater, enclosing a second insulative cavity against the heater, aligned with the temperature-sensitive portion of the component.

11. The component package of claim 10, wherein the first and/or second buffer is formed of a soft insulative material, and pressed against the component and/or heater by a respective inner surface of the outer package.

12. The component package of claim 11, wherein the first and/or second buffer is pre-adhered to its respective inner surface of the outer package, such that upon assembly thereof, said buffer is pressed into place against the component and/or heater.

13. The component package of claim 10, wherein the first and/or second buffer is generally planar and includes a frame projecting from its perimeter toward the component and/or heater to form the cavity against the component and/or heater.

14. The component package of claim 10, wherein at least a portion of the outer package is transfer-molded, and wherein the first and/or second buffer rigidly separates transfer-molded material from the component and/or heater.

15. The component package of claim 10, wherein:
    the optical component is generally planar;
    the heater is generally planar, and adhered to the optical component along a planar surface thereof, to maintain the temperature of the temperature-sensitive portion of the optical component; and
    wherein the cavities enclosed by the first and second buffers are respectively aligned to the temperature-sensitive portion of the optical component.

16. The component package of claim 10, wherein the optical component comprises a planar lightwave circuit (PLC), and wherein the temperature-sensitive portion of the component comprises at least one optical waveguide formed in the PLC.

17. The component package of claim 16, wherein the PLC comprises an arrayed waveguide grating, within the temperature-sensitive portion of the component.

18. A method for packaging an optical component, comprising:
    enclosing a first insulative cavity against a temperature-sensitive portion of the component, using a first insulative buffer; and
    enclosing the buffer and optical component with an outer package, forming additional insulation for the component.

19. The method of claim 18, wherein the first buffer is formed of a soft insulative material, the method further comprising:
    pressing the first buffer against the component using an inner surface of the outer package.

20. The method of claim 19, further comprising:
    pre-adhering the first buffer to the inner surface of the outer package, such that upon assembly thereof, the buffer is pressed into place against the component.

21. The method of claim 18, wherein the first buffer is generally planar and includes a frame projecting from its perimeter toward the component to form the cavity against the component.

22. The method of claim 18, further comprising
    transfer molding at least a portion of the outer package, wherein the first buffer separates transfer-molded material from the temperature-sensitive area of the component.

23. The method of claim 18, further comprising:
    enclosing a second, opposing insulative cavity against an inner surface of the outer package using the first buffer.

24. The method of claim 23, wherein the first buffer is generally planar and includes a frame projecting from its perimeter toward both the component and the inner surface of the outer package, to thereby form the first cavity against the component and the second cavity against the inner surface of the outer package.

25. The method of claim 18, wherein the optical component comprises a planar lightwave circuit (PLC), and wherein the temperature-sensitive portion of the component comprises at least one optical waveguide formed in the PLC.

26. The method of claim 25, wherein the PLC comprises an arrayed waveguide grating, within the temperature-sensitive portion of the component.

27. The method of claim 18, further comprising:
using a heater proximate the optical component to control the temperature of the temperature-sensitive area thereof; and
enclosing a second insulative cavity against the heater, aligned with the temperature-sensitive portion of the component, using a second insulative buffer disposed against the heater.

28. The method of claim 27, wherein the first and/or second buffer is formed of a soft insulative material, the method further comprising:
pressing the first and/or second buffer against the component and/or heater by a respective inner surface of the outer package.

29. The method of claim 28, further comprising:
pre-adhering the first and/or second buffer to its respective inner surface of the outer package, such that upon assembly thereof, the buffer is pressed into place against the component and/or heater.

30. The method of claim 27, wherein the first and/or second buffer is generally planar and includes a frame projecting from its perimeter toward the component and/or heater to form the cavity against the component and/or heater.

31. The method of claim 27, further comprising transfer molding at least a portion of the outer package, wherein the first and/or second buffer rigidly separates transfer-molded material from the component and/or heater.

32. The method of claim 27, wherein:
the optical component is generally planar;
the heater is generally planar, and adhered to the optical component along a planar surface thereof, to maintain the temperature of the temperature-sensitive portion of the optical component; and
wherein the cavities enclosed by the first and second buffers are respectively aligned to the temperature-sensitive portion of the optical component.

33. The method of claim 27, wherein the optical component comprises a planar lightwave circuit (PLC), and wherein the temperature-sensitive portion of the component comprises at least one optical waveguide formed in the PLC.

34. The method of claim 33, wherein the PLC comprises an arrayed waveguide grating, within the temperature-sensitive portion of the component.

* * * * *